METHOD OF FORMING GYPSUM BOARDS WITH HARDENING EDGES

Filed July 24, 1972 2 Sheets-Sheet 1

Aug. 27, 1974 H. B. PEARSON 3,832,250

METHOD OF FORMING GYPSUM BOARDS WITH HARDENING EDGES

Filed July 24, 1972 2 Sheets-Sheet 2

United States Patent Office 3,832,250 Patented Aug. 27, 1974

3,832,250

METHOD OF FORMING GYPSUM BOARDS WITH HARDENING EDGES

Howard Brent Pearson, Las Vegas, Nev., assignor to Johns-Manville Corporation, New York, N.Y.

Filed July 24, 1972, Ser. No. 274,535
Int. Cl. B32b *30/04, 31/00*
U.S. Cl. 156—39 5 Claims

ABSTRACT OF THE DISCLOSURE

A process is described for the incorporation of corn syrup into the edges of gypsum boards to harden those edges. An aqueous corn syrup solution of defined concentration is injected into the edge of a stream of semifluid gypsum "mud" or paste simultaneously with vibration of that mud. The mud is thereafter molded and compressed to form a gypsum board and the impregnated portion of the mud forms the edges of the board. The board is then heated to dry the gypsum and the resulting dried board is found to have edges which are significantly harder than the edges of untreated gypsum boards.

BACKGROUND OF THE INVENTION

Field of the Invention

This invention relates to the production of gypsum boards with hardened edges. Such boards find extensive use in the construction industry.

For many years gypsum wallboards have been used in construction. The boards are produced in standard sizes and delivered to a builder on a construction site in a form in which they can be immediately attached to studs to form wall sections. The seams between adjacent boards are then taped and plastered over, quickly producing a wall ready for painting or papering. Very large quantities of gypsum wallboard are thus used each year in both residential and commercial construction.

Commercial gypsum boards are generally quite long and wide (4 feet by 8 to 14 feet are common dimensions) but quite thin, with common thicknesses being from ⅜ to ⅝ of an inch. Further, it is common practice to make board edges which will be adjacent to edges of other boards slightly thinner than the broad midsection of the board. This practice results in the formation of a tapered recess along both sides of the seam between two adjacent boards, into which the sealing tape can be laid. The plaster covering of the sealing tape then fills the remainder of the depression leaving a smooth flat surface on the finished wall. Thus, for instance, a 4 by 8 foot panel nominally ⅝ of an inch thick might well be tapered down to only 9⁄16 of an inch over a 2½ inch wide strip along both 8 foot long edges (the edges which would be vertical and abutting other gypsum boards in a conventional residential room).

Because of their thinness the edges of gypsum boards are quite susceptible to breakage. It will be readily appreciated that the rough handling afforded such boards during shipping and on construction site will be the source of considerable damage to the edges of the boards. In addition, during the manufacturing process boards are often moved by mechanical devices which push on the edges of the boards or are turned by being rotated on their edges. The finished boards are also usually stacked in large piles containing a number of boards prior to shipment. All of these various instances of movement, handling and storage have a high potential for damaging the edges of the boards.

The particular susceptibility of the edges of gypsum boards to damage as compared to the body of the board is due to a combination of factors. Obviously, the edges of the boards are in more exposed positions during many handling and storage operations. Further, during the drying step in the production of gypsum boards the edge of the board, being exposed to heat on three sides rather than two, tends to dehydrate more readily than the interior of the board. Thus portions of the edges of the board may contain a large amount of the dehydration products of gypsum, materials which have considerably less strength and cohesion than the gypsum in the bulk of the board.

For the above reasons it would be desirable to have a process for the production of gypsum board which would effectively incorporate into the board an agent which would assure that the edges of the finished board would be sufficiently hard to withstand much of the rough handling and usuage which has heretofore been extremely damaging to gypsum boards. It has been known for some time that corn syrup is such an agent. However, there has not previously been a practical satisfactory method of incorporating the corn syrup into the gypsum in a manner which provides edges of superior and uniform hardness. Thus, while a number of patents have described corn syrup as being a suitable material for hardening the edges of gypsum board none has described effective means for incorporating the syrup into the gypsum during formation of the board.

DESCRIPTION OF THE PRIOR ART

U.S. Pat. 2,007,315 describes the use of sugars, including dextrose or "corn sugar," to modify the dissociation temperature at which gypsum is calcined to calcium sulfate hemihydrate by loss of water of crystallization. U.S. Pat. 2,078,199 describes the use of sugars sprayed onto gypsum to regulate the degree of set of the gypsum. U.S. Pat. 2,089,087 discloses the use of starch or similar materials as impregnants to harden the edges of wallboard. U.S. Pat. 3,017,305 discloses spraying dextrose or corn sugar on the paper liner which conventionally covers the gypsum wallboard; the spray is placed on that portion of the paper liner which will be in contact with the edge of the finished board.

SUMMARY

It has now been discovered that a superior gypsum board product having extremely hard edges may be readily and effectively produced by a process which combines vibration of a semifluid gypsum "mud" or paste with impregnation of the edges of the mud by an aqueous corn syrup solution of specific concentration. The process of this invention broadly comprises depositing on a moving first paper liner at least one semifluid "dough-like" mud stream comprising a mixture of gypsum and water, with the stream having a cross-section which is approximately semi-oval in shape; moving the stream into contact with vibrating means which act to extend the semi-oval cross-section laterally with reference to the paper liner and to decrease the height of the cross-section above the paper liner; simultaneously at a point immediately adjacent to the location of the vibrating means injecting, solely into the outermost portion of the stream adjacent the lateral extremities of the liner, an aqueous solution of corn syrup having a concentration in the range of 30% to 70% syrup; and thereafter covering the syrup-containing gypsum with a second paper liner, compressing the paper covered gypsum stream to a board of predetermined thickness and density, and drying the compressed board to form a finished gypsum board having hardened edge portions.

DETAILED DESCRIPTION OF THE INVENTION

The invention herein is a process for the formation of gypsum board with hardened edges. This process permits the simple and efficient formation of such boards without attendant problems of misplacement or concentration of the corn syrup hardening agent or blistering of the board during drying. The process comprises first continuously depositing onto a first moving paper liner at least one continuous paste- or dough-like semi-fluid stream comprising a mixture of gysum and water, the stream having a cross-section which is approximately semi-oval in shape; moving the stream on the liner into contact with vibrating means, the vibrating means acting to extend the semi-oval cross-section of the stream laterally with respect to the liner and to decrease the height of the cross-section above the liner; simultaneously at a point immediately adjacent to the location of the vibrating means injecting, solely into the outermost portion of the stream adjacent the lateral extremities of the liner, an aqueous solution of corn syrup having a syrup concentration in the range of 30% to 70% and thereafter covering the syrup-containing gypsum with a second paper liner, compressing the paper covered gypsum stream to a board of predetermined thickness and density, and drying the compressed board to form a finished gysum board with hardened edge portions.

Figure 1:
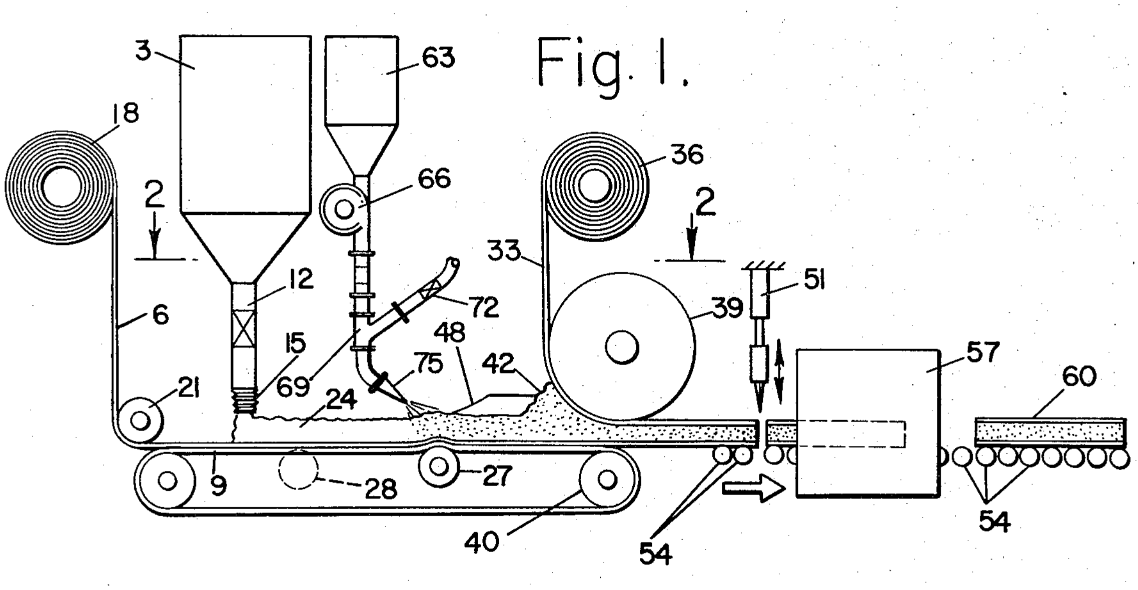
FIG. 1 schematically illustrates the overall process of this invention.
Figure 2:
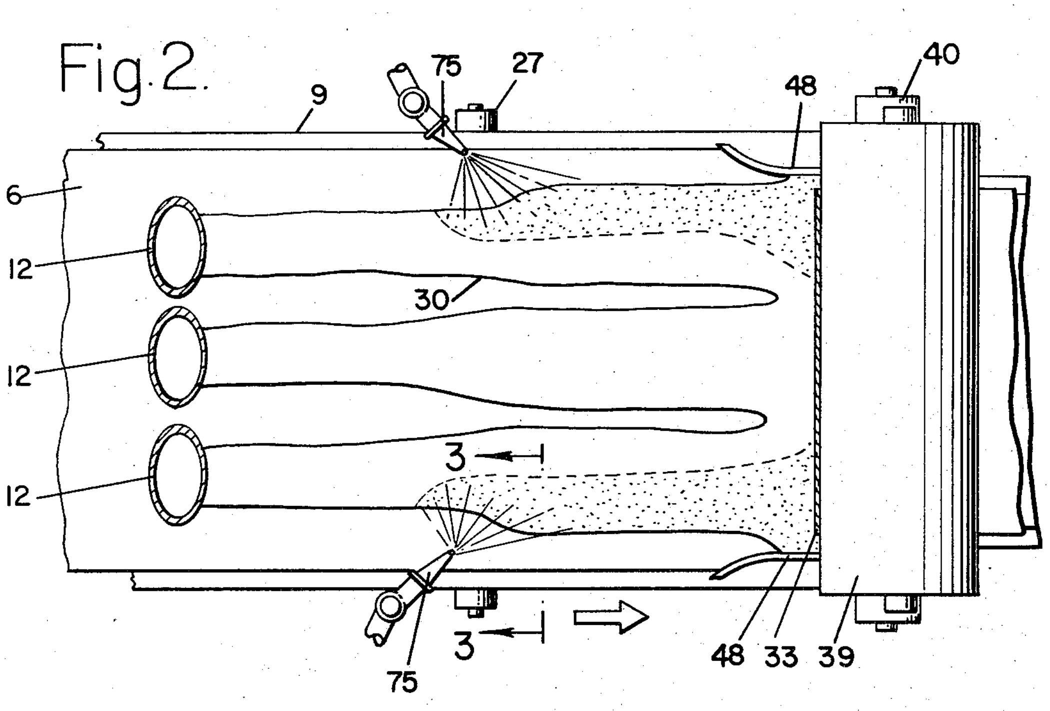
FIG. 2 is a partial plan view schematically illustrating the vibrating and syrup injection portions of the process, taken along plane 2—2 of FIG. 1.

The process will be more easily understood by reference to the attached drawings. In FIG. 1 a high energy mixer 3 contains a mixture of gypsum and water of a consistency sufficiently fluid to flow readily from the mixer by gravity or pressure onto a first paper liner 6 moving along a conveyor belt 9. The consistency is sufficiently solid, however, that the stream of gypsum being deposited on the paper liner will maintain an approximately semi-oval cross-section and will not expand in width a significant degree. This gypsum/water paste or mud flows from the mixer 3 through conduit 12, and is deposited on liner 6. The particular configuration of conduit 12 is not critical. It may be a single duct extending essentially completely across the liner and terminating in a rectangular slot through which the mud passes onto the liner, as shown in aforesaid U.S. Pat. 3,017,305. Alternatively, and preferably, as shown in FIGS. 1 and 2, it is one or more single pipes each terminating in a flexible extension section 15 referred to as a "boot." If conduit 12 is fairly long, there will be a tendency for the mud to begin to set up in the conduit unless a retarder is incorporated into the mud mixture. The technology related to flow and setting of gypsum mud is well known and need not be detailed here. Each boot 15 is positioned adjacent to and above the paper liner in such manner that the gypsum dough is deposited in a stream on the liner at a position inwardly of the lateral extremities of the liner. The deposited "stream" may be a single stream (as illustrated in aforesaid U.S. Pat. 3,017,305) or a plurality of streams may be deposited at intervals laterally across the paper liner; FIG. 2 illustrates the latter arrangement in which three parallel gypsum dough streams are deposited on the paper liner. For convenience herein the "stream" will be referred to in the singular and the syrup injection will at some points be discussed in relation to the two outward extremities of a single stream. It is to be understood, however, that when a plurality of streams are involved the syrup injection is only in the outer edge of each of the outermost streams (as illustrated in FIG. 2).

In FIG. 1 the first paper liner 6 is shown as being continuously unrolled from roll 18 and passed around positioning roll 21 into contact with conveyor belt 9. In conventional practice this first paper liner is the facing liner for the finished gypsum board. It is therefore normally placed on the conveyor belt 9 face down and the gypsum stream or streams are deposited onto what is therefore the back of the first paper liner.

The conveyor belt and subsequent conveying means to be described below move the paper liner and the gypsum stream in the direction indicated by the large arrow in various figures. At a position downstream from the point of deposition of the gypsum mud 24 on the first paper liner 6, the liner and gypsum encounter vibrating means 27. The vibrating means 27 may be any vibrating device adapted to impart moderate vibration to the gypsum mud 24. By "moderate vibration" is intended sufficient vibration to extend or broaden the lateral cross-section a small amount transversely across the paper liner, in the manner indicated at 30 in FIG. 2, and simultaneously to decrease the height above the paper liner surface of the gypsum stream a small amount. If desired a second vibrator may be placed upstream of vibrating means 27, as indicated at 28. This second vibrator 28 is intended solely to provide an initial smoothing effect to gypsum stream 24 after it exists from boot 15 of conduit 12. Except insofar as it provides a slightly more uniform flow of the gypsum stream to vibrating means 27 and the syrup injection portion of the process, second vibrator 28 does not participate in the process of this invention and is therefore entirely optional.

In a critical feature of this invention there occurs, simultaneously with the above described vibration, injection of the corn syrup solution into the outermost edge portions of the gypsum stream. This simultaneous impregnation will be described in detail below.

Following this impregnation the syrup impregnated gypsum mud having a broader, flatter semi-oval cross-section, proceeds downstream on the paper liner and conveyor until it encounters a second paper liner 33 which is continuously unrolled from supply roll 36 and turned about compression roll 39. This second paper liner will be the backing liner of the finished gypsum wallboard. As the slurry reaches compression roll 39 it is squeezed between first paper liner 6 and second paper liner 33 by the action of compression roll 39 in conjunction with a counter roll 40. For convenience and clarity in the figures counter roll 40 is shown as the same roll around which conveyor belt 9 is driven; however, if desired a different roller could be used as counter roll 40. By the action of these two rollers the gypsum mud and encasing paper liners are compressed to essentially the desired thickness of the finished board. Formation of the recessed portion of the board is conventional and is not illustrated herein. The necessity of passing under the nip of the compression roll 39 causes the gypsum stream to dam up slightly ahead of the compression roll, as indicated at 42. This damming effect also cause the gypsum mud to spread transversely across the paper liner completely covering that portion of the first liner transversely between guide shoes 48. Guide shoes 48 are set apart at a distance essentially equal to the desired width of the finished board. They will normally be set slightly inwardly of the transverse extremities of the first paper liner, in order to leave a sufficient amount of uncovered liner to be folded over the edge of the gypsum board and attached to the backing liner at a later step in the process. The compression provided by the compression roll 39 will be sufficient to impart to the board the desired dimensions of thickness and also the desired density. Density will also be a function of the concentration of the gypsum mud and the quantity of mud deposited on the moving first paper liner per unit time. Determination and control of these factors are conventional in the art and need not be further described.

At some point prior to pressure formation of the board, the edges of first paper liner 6 are folded upward and then around the top of the gypsum mud. In the example shown in FIG. 1 this is accomplished by guide shoes 48. Thereafter the second paper liner 33 is glued or otherwise adhered to the folded edges of the first paper liner 6 to form a continuous paper coating around the entire board.

Following pressure formation by compression roll 39 and counter roll 40 the continuous shaped board is passed through folding means 48. In folding means 48 the outer uncovered portion of the first paper liner 6 is folded around the edge of the board and glued or otherwise adhered to the second paper liner 33 thus forming a continuous paper coating entirely around the gypsum board. The continuous paper encased gypsum board then passes through cutting means 51 which severs the board transversely into predetermined lengths. The board upon leaving severing means 51 therefore has what will be essentially its final dimensions of length, width and thickness. The individual boards are then conveyed by conventional conveyor means (such as powered rollers 54) through heating means 57 in which the gypsum is dried to form a board of the desired finished dry density. Heating means 57 will normally be a hot air tunnel where air heated to an elevated temperature (by furnace means not shown) contacts the boards for a period of about ½ to 2 hours. The finished board 60 is then trimmed to final size if necessary and stacked or otherwise stored for shipment.

The simultaneous vibration of the gypsum mud and the impregnation of the edge portions of the stream is illustrated in detail in the drawings. The aqueous solution of corn syrup (which will be described in further detail below) is contained in storage vat 63. From vat 63 the solution flows through a regulating pump 66 and then into a mixing wye 69 where it is mixed with a compressed air stream which enters through conduit 72 from a compressed air supply source not shown. Both regulating pump 66 and a regulator in the compressed air stream will be controlled in conjunction with the speed of conveyor 9 and the flow rate of the gypsum stream 24 so that the quantity and injection pressure of the syrup solution is maintained at appropriate values to insure the injection of the solution into the gypsum mud at the desired velocity.

Figure 3:
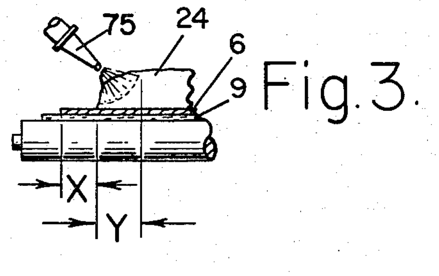
FIG. 3 is a fragmentary cross-sectional view illustrating injection of the syrup solution into an edge portion of the gypsum stream, taken along plane 3—3 of FIG. 2.

The solution/air mixture is forced through nozzles 75 and injected into each outer edge of the gypsum stream 24. The pattern of impregnation is essentially that shown in FIGS. 3 and 4. The solution will be under sufficient air pressure to force it into the outer edge of the gypsum stream to an appreciable depth, as illustrated in FIG. 3. In normal practice the pressure will not be so high that the solution is forced completely through the stream to the underlying first paper liner. Neither should the pressure be so great that the impact of the solution stream on the edge of the gypsum mud causes the latter to be significantly splattered. Conversely the pressure must be high enough to allow the solution to penetrate well into the gypsum stream; the solution is not effective if merely coated onto the surface of the gypsum stream. The air pressure will ordinarily be in the range of 1 p.s.i.g. to 75 p.s.i.g., with the preferred range being 15 p.s.i.g. to 25 p.s.i.g. These pressure ranges are of course dependent upon maintaining the injection nozzles 75 at the distances relative to the gypsum stream described below. Obviously the pressure may be reduced if the nozzles are moved closer to the streams and the pressure will be increased as the nozzles are moved farther away from the stream.

Figure 4A:
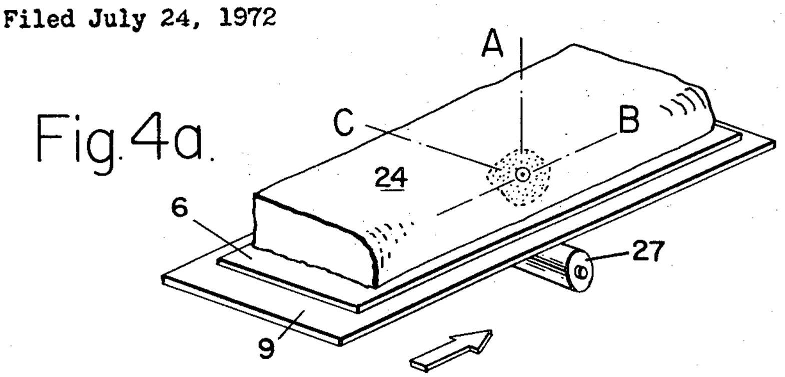
FIGS. 4*a* through 4*d* illustrate the spatial relationship of the syrup injection nozzles to the moving gypsum stream.

The positioning of each nozzle 75 may be designated in accordance with the coordinate system illustrated in FIG. 4*a*. The axis labeled B is the longitudinal axis in the direction of motion of the conveyor. The axis C is the transverse axis across the conveyor. The axis A is the vertical axis normal to the plane of the conveyor. The distance X designated in FIG. 3 is the distance from the outermost edge of the first paper liner to the outermost edge of the gypsum stream. The distance Y is the distance between the outermost edge of the gypsum stream and the point at which the perimeter of the semi-oval cross-section of the gypsum stream becomes essentially horizontal. As indicated in FIGS. 3 and 4 essentially all of the syrup solution will be injected into the gypsum stream within the area indicated by the dimension Y, since it is this region which ultimately becomes the edge of the finished gypsum board. A small amount of the syrup solution may be sprayed into the gypsum stream in the portion inwardly of and adjacent to the region designated by the dimension Y. Since, however this does not ordinarily aid to a great degree in hardening the edge portion itself the spray pattern should be concentrated as much as possible within the area indicated by the dimension Y. Further, the spray should be concentrated entirely on the gypsum stream itself and there should be essentially no syrup solution sprayed directly on the paper in the region indicated by the dimension X.

Ordinarily the dimension X will be on the order of 1 to 12 inches, preferably 2 to 3 inches, depending on the thickness of the finished board desired, the fluidity of the gypsum stream and the speed of the conveyor 9. The dimension Y will normally be in the range of from 1 to 6 inches, preferably 1 to 3 inches, depending on the fluidity of the gypsum stream and its tendency to spread laterally across the conveyor.

Figure 4B:
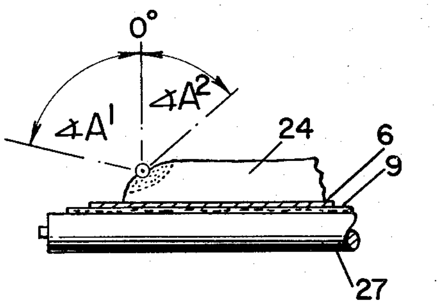
Figure 4C:
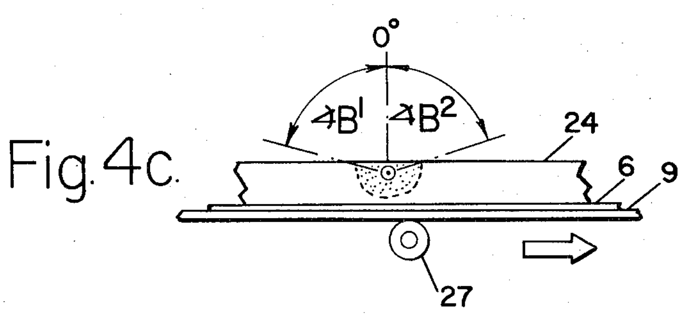
Figure 4D:
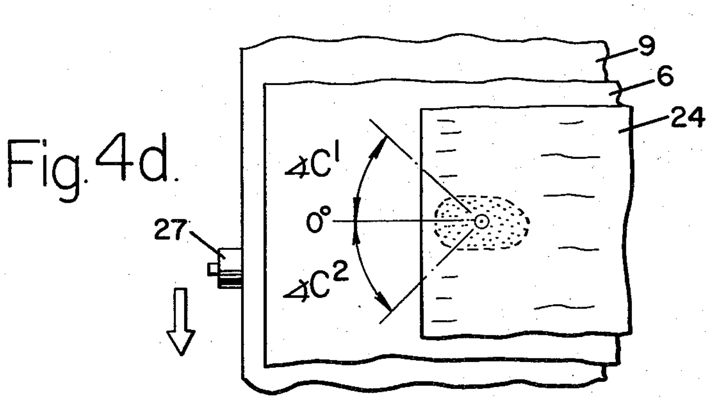

The nozzle 75 is ordinarily placed at a distance of from ⅛ inch to 24 inches, preferably 2 to 6 inches, more preferably 3 to 4 inches from the gypsum stream. This dimension is measured along the longitudinal axis of the nozzle itself. If desired, a nozzle may be moved closer or farther from the stream surface. Such placement is not desirable, however, for small irregularities in the surface of the gypsum stream can interfere with the nozzle if the latter is too close to the stream, and if it is too far away, the spray pattern and degree of syrup penetration is too hard to control properly. The spray pattern as projected on the gypsum stream may be circular, elliptical, oval or rectangular. The angle at which each nozzel is placed relative to the point at which the syrup solution is injected into the gypsum stream (i.e., the nozzle angle) is illustrated in FIGS. 4*a* through 4*d*. FIG. 4*a* indicates the coordinate system which uniquely determines the positioning of the nozzles. FIGS. 4*b*, 4*c* and 4*d* individually indicate the projected angle of the nozzle in each of the three coordinates. In the three views 4*b*, 4*c* and 4*d* the various angle designations are measured from the labeled axis: the angles $A^1$, $A^2$, $B^1$, and $B^2$ are all measured from the vertical (i.e., 0° is vertical, 90° is horizontal), while angles $C^1$ and $C^2$ are measured from the transverse line of the stream (i.e., 0° is the plane transverse to the direction of travel of the gypsum stream while angles greater than 0° denote an orientation increasingly parallel to the direction of travel). Angle $A^1$ may be between 0° and 90°, and preferably is 0° to 40°. Angle $A^2$ may be up to 70° depending on the thickness of the gypsum mud and the distance between the nozzle and the mud surface. Angles $B^1$ and $B^2$ may each be up to 80°, although it is preferred that Angle $B^1$ be about 20° to 30°. Similarly, Angles $C^1$ and $C^2$ may each be up to 80° although it is preferred that Angle $C^1$ be between 40° and 50°. In all cases the angle designated 1 is preferred to the angle designated 2. The zero point of the coordinate system is designated to be the center of the impact pattern of the spray on the surface of the gypsum and is indicated schematically in FIG. 4 by a small circle.

As noted above the area of impact of the solution jet will be immediately adjacent to vibrating means 27. It is preferred that the point of impact be immediately upstream of the vibrator 27, where the initial encounter of the gypsum stream 24 with vibration means 27 first causes the gypsum stream to begin to slump and spread. When the gypsum stream requires some initial smoothing, and some smoothing means such as vibrator 28 is not present, it may be preferable to utilize the smoothing effect of vibrator 27 by injecting the syrup into the gypsum stream 24 immediately downstream of vibrator 27. The upstream preferred impact area is shown in FIGS. *4a*, *4c*, and *4d*. The same figures can be considered to also illustrate the downstream injection if the indicated direction of travel of the gypsum stream is reversed.

The syrup solution which is used in the process of this invention is an aqueous solution containing 30 to 70% of corn syrup, with preferably about 40 to 50% syrup concentration. In this concentration range the specific gravity of the solution is approximately 11.60 to 11.80. Corn syrup is itself a concentrated water solution of partial hydrolyzates of starch. It normally contains dextrose, maltose and higher oligosaccharides. The substance is quite viscous and generally requires heating to about 80° to 110° F. in order to be readily pumped into a mixing tank for dilution with water to make the syrup solution of the present invention. Once the syrup is diluted to the above concentration range, auxiliary heating is not generally necessary as long as the syrup solution is not exposed to temperatures much below about 30 to 40° F. The diluted aqueous solution sprays and flows readily and can be easily pumped at room temperature.

The amount of spray impregnated into the gypsum mud is generally in the range of between 0.1 and 25 lbs. per 1,000 sq. ft. ("M s.f.") of gypsum board having a nominal thickness of about ½ inch. It is preferred that the syrup be used in a quantity of about 0.5 to 5 lbs./M s.f., more preferably 1.5 to 3 lbs./M s.f. As noted above the syrup must penetrate fairly deeply into the gypsum stream in order to be effective; merely coating the surface of the stream has been found to be ineffective.

The concentration of the syrup solution must be carefully controlled. If the solution is too dilute it will form puddles of water in the gypsum which will tend to weaken the finished board. Conversely, if the solution is too concentrated the board will form severe blisters when heated for drying.

The following example will illustrate the process of this invention. A conventional gypsum slurry was formed and deposited in three streams on a paper liner, as illustrated in FIG. 2. The conveyor belt moved at an average speed of 153 ft. per minute, the speed required to form nominal ½ inch thickness finished board. The outer edges of the two outer streams were each impregnated with approximately 2 lbs. of a 45% syrup solution per 1,000 sq. ft. of board. Injection was at a point immediately preceding the vibrator. Each spray nozzle was positioned 3½ inches from the surface of the gypsum stream and positioned with angles $B^1$ and $C^1$ at approximately 45° and angle $A^1$ at approximately 10°. Following impregnation the boards were pressure formed, cut to size and dried for approximately one hour. (In another vein where nominal ⅝ inch board was being made, angle $A^1$ was about 30°. It has been found that the flatter angle is more advantageous with the thicker materials.)

Edge hardness was determined by a "Hunter hardness tester." In this device a sharp thin needle projects 5⁄16" out of the testing device and is directly connected to a scale calibrated in pounds of force. The scale measures the amount of force required to insert the needle to its full length into the edge of a gypsum board. Since the folded paper liner covers the edge of the board the minimum penetration will be that necessary to penetrate the paper liner; this value is normally approximately 8 lbs. Prior to use of the edge hardening process of this invention gypsum boards made under the identical conditions described above but without the syrup impregnation at the point of the vibrator had edge hardness values in the Hunter test of between 8 and 14 lbs., usually about 11 lbs. This indicated that the principal penetration resistance lay not with the gypsum board but rather with the paper liner. In contrast gypsum boards with the edges impregnated by the syrup solution as described above have shown minimum edge hardnesses of at least 14 lbs., ranging up to a maximum of about 26 lbs.; the average edge hardness is in the range of 16 to 17 lbs. This represents an average increase of over 100% in the hardness of the gypsum in the edges of boards produced by the process of this invention.

In a simpler but more graphic illustration of the improved hardness of the boards created by this invention, the penetration of an ordinary pen knife blade into the side of a board was observed. In an untreated board the pen knife blade could be fairly easily inserted into the edge to its full length (approximately 1½ inch); in the treated board, however, the pen knife blade could not be inserted more than about ¼ inch into the edge of the board.

What I claim is:

1. A process for the formation of gypsum board having hardened edges which comprises: first continuously depositing onto a first moving paper liner at least one continuous dough-like stream comprising a mixture of gypsum and water, said deposited stream having a cross section which is approximately semi-oval in shape; moving said stream on said first paper liner into contact with vibrating means, said vibrating means acting to extend said semi-oval cross section of said stream laterally with respect to said first paper liner and to decrease the height of said cross section above said first paper liner; simultaneously at a point in the approximate vicinity of said vibrating means injecting, solely into those outermost stream portions adjacent the lateral extremities of the liner, an aqueous solution of corn syrup having a syrup concentration in the range of 30%–70%, and thereafter covering said syrup-containing gypsum with a second paper liner, compressing the paper covered gypsum stream to a board of predetermined thickness and density such that said outermost stream portions define opposite edges of said board, and drying the compressed board to form a finished gypsum board with hardened edge portions.

2. The process of Claim 1 wherein said aqueous solution of corn syrup has a syrup concentration of 40%–50%.

3. The process of Claim 1 wherein said aqueous corn syrup solution is injected into said gypsum stream in an amount of between 0.1 and 25 pounds per 1,000 square feet of gypsum board having a nominal thickness of about ½ inch.

4. The process of Claim 3 wherein said solution is injected into said stream in an amount of about 0.5 to 5 pounds per 1,000 square feet of said gypsum board.

5. The process of Claim 1 wherein said aqueous corn syrup solution is injected into said gypsum stream by being mixed with air under a pressure of from 1 to 75 p.s.i.g. and forced through at least one nozzle positioned adjacent to said gypsum stream.

References Cited

UNITED STATES PATENTS

| | | | |
|---|---|---|---|
| 3,017,305 | 1/1962 | Dailey | 161—266 X |
| 2,200,155 | 5/1940 | Camp et al. | 117—Dig. 8 |
| 2,078,199 | 4/1937 | King | 106—114 |
| 2,007,315 | 7/1935 | Turner | 106—114 |
| 2,089,087 | 8/1937 | Fletcher | 161—147 |
| 3,532,576 | 10/1970 | Proctor et al. | 156—39 X |
| 3,533,829 | 10/1970 | Quanquin | 118—303 X |
| 1,489,693 | 4/1924 | Brookby | 156—39 |
| 2,985,219 | 5/1961 | Sommerfield | 156—39 |

DOUGLAS J. DRUMMOND, Primary Examiner

D. A. SIMMONS, Assistant Examiner

U.S. Cl. X.R.

106—114; 156—40; 161—147